(12) United States Patent
Rull Prous et al.

(10) Patent No.: US 8,329,672 B2
(45) Date of Patent: Dec. 11, 2012

(54) ORAL AND/OR TOPICAL COMPOSITIONS COMPRISING PREBIOTICS AND FATTY ACID

(75) Inventors: Santiago Rull Prous, Barcelona (ES); Bernd Fabry, Korschenbroich (DE); José Blasquez Fernandez, Terrassa (ES); Doris Bell, Duesseldorf (DE)

(73) Assignee: Cognis IP Management GmbH, Duesseldorf (DE)

( * ) Notice: Subject to any disclaimer, the term of this patent is extended or adjusted under 35 U.S.C. 154(b) by 837 days.

(21) Appl. No.: 11/597,776

(22) PCT Filed: May 14, 2005

(86) PCT No.: PCT/EP2005/005318
§ 371 (c)(1), (2), (4) Date: Mar. 7, 2008

(87) PCT Pub. No.: WO2005/115172
PCT Pub. Date: Aug. 12, 2005

(65) Prior Publication Data
US 2008/0193406 A1 Aug. 14, 2008

(30) Foreign Application Priority Data
May 25, 2004 (EP) .................................. 04012287

(51) Int. Cl.
*A01N 43/04* (2006.01)
*A61K 31/715* (2006.01)

(52) U.S. Cl. ........................................................ 514/54
(58) Field of Classification Search .................. None
See application file for complete search history.

(56) References Cited

U.S. PATENT DOCUMENTS

| | | | |
|---|---|---|---|
| 5,380,717 | A | 1/1995 | Ohkuma et al. |
| 5,502,077 | A | 3/1996 | Breivik et al. |
| 5,780,451 | A | 7/1998 | DeMichele et al. |
| 6,368,617 | B1 * | 4/2002 | Hastings et al. ............... 424/439 |
| 6,468,556 | B1 * | 10/2002 | Noda et al. ..................... 424/439 |
| 2002/0187134 | A1 | 12/2002 | Ranganathan et al. |
| 2003/0068357 | A1 | 4/2003 | Vala et al. |

FOREIGN PATENT DOCUMENTS

| | | |
|---|---|---|
| DE | 39 26 658 C2 | 10/1998 |
| EP | 0 593 774 A1 | 4/1994 |
| GB | 2 355 382 A | 4/2001 |
| WO | WO 95/26646 A1 | 10/1995 |
| WO | WO 97/29763 A1 | 8/1997 |
| WO | WO 01/30359 A1 | 5/2001 |
| WO | WO 02/43719 A2 | 6/2002 |

OTHER PUBLICATIONS

Scientific Psychic, http://www.scientificpsychic.com/fitness/fattyacids1.html, downloaded from the internet Jan. 13, 2012.*
Garleb K A et al: "Effect of Fructooligosaccharide Containing Enteral Formulas on Subjective Tolerance Factors, Serum Chemistry Profiles, and Faecal Bifidobacteria in Healthy Adult Male Subjects", Microbial Ecology in Health & Disease, Chichester, GB, vol. 9, No. 6, 1996, pp. 279-285, XP008023764.
Maki Kevin C et al: "Food products containing free tall oil-based phytosterols and oat beta-glucan lower serum total and LDL cholesterol in hypercholesterolemic adults.", Mar. 2003, Journal of Nutrition, vol. 133, NR. 3, pp. 808-813, XP002303885.
Lin T Y: "Influence of Lactic Cultures, Linoleic Acid and Fructo-Oligosaccharides on Conjugated Linoleic Acid Concentration in Non-Fat Set Yogurt", Apr. 2003, Australian Journal of Dairy Technology, Dairy Industry Assn Australia, Highett VIC, AU, pp. 11-14, XP001166336.
Anonymous: "Prebiotics" Internet Article, 'Online! Jun. 4, 2003, XP002303886, Retrieved from the Internet: URL:http://www.pdrhealth.com/drug_info/nmdrugprofiles/nutsupdrugs/pre_0326.shtml>'retrieved on Nov. 2, 2004! the whole document & Internet Article, 'Online! Jun. 4, 2003, Retrieved from the Internet: URL:http://web.archive.org/web/20030604182836/http://pdrhealth.com>'retrieved on Nov. 2, 2004! to prove publication data of XP 002303886.
Mizota T: "Lactulose As a Growth Promoting Factor for *Bifidobacterium* and Its Physiological Aspects", Bulletin—International Dairy Federation, Brussels, BE, vol. 313, 1996, pp. 43-48, XP000677675.
Ohkusa T et al: "Long-term ingestion of lactosucrose increases *Bifidobacterium* sp. in human fecal flora", 1995, Digestion, Basel, CH, pp. 415-420, XP009028691.
Roberfroid M B: "Functional Foods: Concepts and Application to Inulin and Oligofructose", British Journal of Nutrition, Cambridge, GB, vol. 87, No. Suppl 2, 2002, p. S139-S143, XP009008910.

* cited by examiner

*Primary Examiner* — Layla Bland
(74) *Attorney, Agent, or Firm* — Diehl Servilla LLC

(57) ABSTRACT

Compositions for oral and/or topical administration of a prebiotic and a physiologically active fatty acid, or a salt or ester thereof, are disclosed. The compositions are disclosed as enhancing the body's population of beneficial microorganisms for improving health and well-being.

9 Claims, No Drawings

ORAL AND/OR TOPICAL COMPOSITIONS COMPRISING PREBIOTICS AND FATTY ACID

CROSS-REFERENCE TO RELATED APPLICATIONS

This application is a national phase filing under 35 U.S.C. §371 and claims priority to International Application No. PCT/EP2005/005318 which has an International filing date of May 14, 2005, and which designated the United States of America and which claims priority to European Application No. 04012287.1, filed May 25, 2004, the entire disclosures of which are hereby incorporated herein by reference.

FIELD OF THE INVENTION

The present invention is related to the area of alimentation and concerns oral and/or topical compositions comprising defined fatty acids or their esters and prebiotics, dietary supplements and food compositions comprising said fatty acids or their esters and prebiotics, and the use of mixtures comprising physiologically active fatty acids or their esters and prebiotics for improving the stimulation of the growth of healthy bacteria.

BACKGROUND OF THE INVENTION

Probiotics contain live bacteria and represent an important part of the complex world of foods that are good for health. It is the bacteria and the metabolites which they produce that give these products their health promoting properties. The best known example of a probiotic is yogurt. The experimental data for yogurt is still not as conclusive as one would like, however, human studies related to the consumption of dietary milk products show increased milk digestibility, quicker recovery from certain types of diarrhea, enhanced immune function, relation in certain cancers, and possible lowering of blood cholesterol levels.

Bacteria found in products like yogurt, kefir or fermented vegetables usually aren't found in the human intestine. In fact, the intestinal environment is often a hostile one for these foreign bacteria. Because of this, bacteria eaten in probiotic products don't colonise the intestine but are flushed through and eliminated from the body.

The bacteria living in the intestine make up a very large and very diverse population. The numbers of each kind of bacteria change depending on age, diet, health status, and use of drugs and supplements. The effects are linked to the ability of the bacteria to adhere to the intestinal wall and use the semi-digested food that is passing through the intestines. It is not surprising to have found that the bacterial population in the intestines of vegetarians is much different compared to that of meat eaters. Because some bacteria have specific nutrient requirements, it has been proposed that adding these particular foods or nutrients to the diet could be a way of increasing the numbers of specific bacteria. Such additives are called "prebiotics". Thus, to be effective, prebiotics must escape digestion in the upper gastrointestinal tract and be used by a limited number of the microorganisms comprising the colonic microflora. In the large intestine, prebiotics are converted into short-chain fatty acids like capronic or caprylic acid. Said acids are used by the human body as an energy source. Besides this, the short-chain acids are known to inhibit inflammation of the intestine, which represents a kind of cancer prophylaxis. In addition, prebiotics increase the resorption time in the intestine which leads to an improved uptake of minerals. Typical examples for well-known prebiotics are oligosaccharides, e.g. in 1995, Gibson et al. found that oligofructose and inulin, when fed to humans, selectively stimulated the growth of bifidobacteria without influencing the numbers of *lactobacillus*. Since prebiotics mainly stimulate the growth of bifidobacteria, they also are referred to as bifidogenetic factors.

Although various types of prebiotics are known from the literature and can be found in the market, there is still an increasing need for more active alternatives or additives which support the various activities of existing products in a synergistic manner. Therefore, the object of the present invention has been to provide a new system of prebiotic compounds, which shows a synergistic stimulation of the growth of healthy bacteria, preferably bifido and lactic bacteria both, and improves the health status of the human body.

DETAILED DESCRIPTION OF THE INVENTION

The terms "prebiotics" and "fatty acids" used below and throughout the specification shall be understood to encompass one or more.

The present invention provides oral and/or topical compositions, comprising
(a) prebiotics; and
(b) physiologically active fatty acids, their salts or their esters, and mixtures thereof.

Surprisingly, it has been observed that mixtures of said physiologically active fatty acids and prebiotics show a synergistic behavior with respect to stimulation of growth of bacteria selected from the group consisting of *Bifidobacterium breve, Bifidobacterium infantis, Bifidobacterium longum* and *Bifidobacterium adolescentis* on one hand, and *Lactobacillus bulgaricus, Lactobacillus acidophilus, Lactobacillus casei, Lactobacillus plantarum, Streptococcus faecium*, and *Streptococcus thermophilus* on the other. In addition, prebiotics have been found to increase the conversion of vaccinic and linoleic acid to CLA in the intestine.

Prebiotics

Prebiotics are defined as non-digestible food ingredients that may beneficially affect the host by selectively stimulating the growth and/or the activity of a limited number of bacteria in the colon. The following describes the various oligosaccharides which can be taken into account as suitable prebiotics (component a):

Fructooligosaccharides

Fructooligosaccharides or FOS typically refer to short-chain oligosaccharides comprised of D-fructose and D-glucose, containing from three to five monosaccharide units. FOS, also called neosugar and short-chain FOS, are produced on a commercial scale from sucrose using a fungal fructosyltransferase enzyme. FOS are resistant to digestion in the upper gastrointestinal tract. They act to stimulate the growth of *Bifidobacterium* species in the large intestine. FOS are marketed in the United States in combination with probiotic bacteria and in some functional food products.

Inulins

Inulins refer to a group of naturally-occurring fructose-containing oligosaccharides. Inulins belong to a class of carbohydrates known as fructans. They are derived from the roots of chicory (*Cichorium intybus*) and Jerusalem artichokes. Inulins are mainly comprised of fructose units and typically have a terminal glucose. The bond between fructose units in inulins is a beta-(2-1) glycosidic linkage. The average degree of polymerisation of inulins marketed as nutritional supplements is 10 to 12. Inulins stimulate the growth of *Bifidobacterium* species in the large intestine.

Isomaltooligosaccharides

Isomaltooligosaccharides comprise a mixture of alpha-D-linked glucose oligomers, including isomaltose, panose, isomaltotetraose, isomaltopentaose, nigerose, kojibiose, isopanose and higher branched oligosaccharides. Isomaltooligosaccharides are produced by various enzymatic processes. They act to stimulate the growth of *Bifidobacterium* species and *Lactobacillus* species in the large intestine. Isomaltooligosaccharides are marketed in Japan as dietary supplements and in functional foods. They are being developed in the United States for similar uses.

Lactilol

Lactilol is a disaccharide analogue of lactulose. Its pharmaceutical use is in the treatment of constipation and hepatic encephalopathy. Lactilol is also used in Japan as a prebiotic. It is resistant to digestion in the upper gastrointestinal tract and is fermented by a limited number of colonic bacteria, resulting in an increase in the biomass of bifidobacteria and lactobacilli in the colon. Lactilol is known chemically as 4-O-(beta-D-galactopyranosyl)-D-glucitol. Lactilol is not approved for the treatment of hepatic encephalopathy or constipation in the U.S., and its use as a prebiotic is considered experimental. Lactilol is used in Europe as a food sweetener.

Lactosucrose

Lactosucrose is a trisaccharide comprised of D-galactose, D-glucose and D-fructose. Lactosucrose is produced enzymatically by the enzymatic transfer of the galactosyl residue in lactose to sucrose. Lactosucrose is resistant to digestion in the stomach and small intestine. It is selectively utilized by intestinal Bifidobacterium species resulting in significant induction of growth of these bacteria in the colon. Therefore, under physiological conditions, lactosucrose acts on the intestinal microflora as a growth factor for *Bifidobacterium* species. Lactosucrose is also known as 4G-beta-D-galactosylsucrose. It is widely used in Japan as a dietary supplement and in functional foods, including yogurt. Lactosucrose is being developed in the United States for similar uses.

Lactulose

Lactulose is a semi-synthetic disaccharide comprised of the sugars D-lactose and D-fructose. The sugars are joined by a beta-glycosidic linkage, making it resistant to hydrolysis by human digestive enzymes. Lactulose is, however, fermented by a limited number of colonic bacteria. This can lead to changes in the colonic ecosystem in favour of bacteria, such as lactobacilli and bifidobacteria, which may confer some health benefits. Lactulose is a prescription drug in the United States for the treatment of constipation and hepatic encephalopathy. It is marketed in Japan for use as a dietary supplement and in functional foods. Its use in the United States as a prebiotic substance is still experimental.

Pyrodextrins

Pyrodextrins comprise a mixture of glucose-containing oligosaccharides that is derived from the hydrolysis of starch. Pyrodextrins have been found to promote the proliferation of *Bifidobacterium* species in the large intestine. They are resistant to digestion in the upper gastrointestinal tract. Pyrodextrins are being developed for the nutritional supplement market place.

Soy oligosaccharides

Soy oligosaccharides refer to oligosaccharides found in soybeans and also in other beans and peas. The two principal soy oligosaccharides are the trisaccharide raffinose and the tetrasaccharide stachyose. Raffinose comprises one molecule each of D-galactose, D-glucose and D-fructose. Stachyose consists of two molecules of D-galactose, one molecule of D-glucose and one molecule of D-fructose. Soy oligosaccharides act to stimulate the growth of *Bifidobacterium* species in the large intestine. They are marketed in Japan as dietary supplements and in functional foods. They are being developed in the United States for similar uses.

Transgalactooligosaccharides

Transgalactooligosaccharides (TOS) are a mixture of oligosaccharides consisting of D-glucose and D-galactose. TOS are produced from D-lactose via the action of the enzyme beta-galactosidase obtained from *Aspergillus oryzae*. TOS are resistant to digestion in the upper gastrointestinal tract and stimulate the growth of bifidobacteria in the large intestine. TOS are marketed in Japan and Europe as dietary supplements and are used in functional foods. They are being developed for similar use in the United States.

Xylooligosaccharides

Xylooligosaccharides are comprised of oligosaccharides containing beta (1→4) linked xylose residues. The degree of polymerisation of xylooligosaccharides is from two to four. Xylooligosaccharides are obtained by enzymatic hydrolysis of the polysaccharide xylan. They are marketed in Japan as prebiotics and are being developed for similar use in the United States.

Biopolymers

Suitable biopolymers like e.g. beta-glucans include those originating from plants including cereals such as oats and barley, fungi, yeast, and bacteria. In addition, microbial cell wall preparations and whole cells rich in beta glucans are also suitable sources for beta glucan preparations useful for the present invention. Monomer residues in glucans can have 1-3 and 1-4, or 1-3 and 1-6 linkages (that is the monomer units are joined through 1,3, 1,4 or 1,6 bonds) and the percent of each type can vary. Preferably, beta glucans derived from yeast, particularly from *Saccharomyces*, preferably *Saccharomyces cerevisiae*, are used for the present invention. It will be appreciated, however, that other beta glucans would also be suitable. Further examples for suitable biopolymers are chitin and its derivatives, preferably oligoglucosamin and chitosan which represents a typical hydrocolloid.

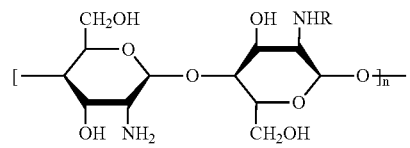

Chitosan is obtained by deacetylisation of chitin and shows molecular weights in the range of 50,000 up to 2,000,000.

Physiologically Active Fatty Acids, their Salts and their Esters

A common criterion for fatty acids with physiological activity, which represent component (b), is a fat chain having a sufficient number of carbon atoms providing a lipophilic behavior that allows the molecule to pass through the gastrointestinal tract of the body, and possesses a sufficient number of double bonds. Therefore, the fatty acids suitable for use in the invention usually comprise 18 to 26 carbon atoms and 2 to 6 double bonds.

In a first embodiment of the present invention, conjugated linoleic acid (CLA) or its alkaline or alkaline earth salts and esters, preferably esters with lower aliphatic alcohols having 1 to 4 carbon atoms—or their glycerides, specially their triglycerides, are suitable. Conjugated linoleic acid (CLA) represents a commercially available product which usually is obtained by base-catalysed isomerisation of sunflower oil or their respective alkyl esters and subsequent isomerisation in the presence of enzymes. CLA is an acronym used for positional and geometric isomers derived from linoleic acid (LA, cis-9,cis-12-octadecadienoic acid, 18:2n-6). From a physiological point of view, the use of the cis-9,trans-11 isomer, according to the present invention, having at least 30, preferably at least 50 and most preferably at least 80% b.w. of said cis-9,trans-11 isomer—calculated on the total CLA content of the crude mixture—is preferred. In addition, it has been found advantageous if the content of the trans-10,cis-12 isomer is at most 45, preferably at most 10% b.w. and most preferably is less than 1% b.w., and the sum of 8,10-, 11,13- and trans,trans-isomers in total is less than 1% b.w.—calculated on the total CLA content. Such products can be found in the market, for example, under the trademark Tonalin® CLA-80 (Cognis).

In a second embodiment, omega-3 fatty acids are suitable, which acids typically comprise 18 to 26, preferably 20 to 22 carbon atoms and at least 4 and up to 6 double bonds. Also these molecules are very well known from the art and can be obtained by standard methods, for example, via transesterification of fish oils, followed by urea precipitation of the alkyl esters thus obtained, and a final extraction using non-polar solvents as described in the German patent DE 3926658 C2 (Norsk Hydro). Fatty acids thus obtained are rich in omega-3 (all-Z)-5,8,11,14,17-eicosapentanoic acid (EPA) C 20:5 and (all-Z)-4,7,10,13,16,19-docosahexanoic acid (DHA) C 22:6. Such products can be found under the trademark Omacor® (Pronova).

In a third embodiment, linoleic acid, vaccinic acid (trans 11-octadecenoic acid) or cishexadecenoic acid (obtained for example from the plant *Thunbergia alata*) can be used.

In addition to the use or the physiologically active fatty acid esters in the embodiment of their lower alkyl esters or glycerides, an additional preferred embodiment of the present invention relates to compositions comprising esters of the fatty acids with sterols. Like glycerides, sterol esters are easily resorbed and split by the human body, however, a significant advantage comes from the fact that the cleavage of the ester bond releases a second molecule with health promoting properties. The terms "sterol", "stanol" and "sterin" shall be understood to be synonyms defining steroids showing a single hydroxyl group linked to the C-3. In addition, sterols, having 27 to 30 carbon atoms, may possess a double bond, preferably in 5/6 position. According to the present invention, esters of CLA or omega-3 fatty acids with β-sitosterol or its hydrogenation product β-sitostanol are preferred.

Oral and/or Topical Compositions

The oral and/or topical compositions, according to the present invention, may comprise the prebiotics and the fatty acids in a weight ratio of 99 to 1 to 50:50 and more particularly 95:10 to 75:25. The highest synergistic effects, however, are observed at ratios of 92:8 to 80:20. In general, the compositions can be used in a concentration of up to about 10, particularly 0.5 to 8 and more particularly 1 to 2% b.w.—calculated on the probiotic microorganisms being present in the final food composition. One percent, however, has been found to be particularly suitable.

In another special embodiment of the present invention, the compositions are macro- or micro-encapsulated. "Microcapsules" are understood to be spherical aggregates with a diameter of about 0.1 to about 5 mm which contain at least one solid or liquid core surrounded by at least one continuous membrane. More precisely, they are finely dispersed liquid or solid phases coated with film-forming polymers, in the production of which, the polymers are deposited onto the material to be encapsulated after emulsification and coacervation or interfacial polymerization. In another process, liquid active materials are absorbed in a matrix ("microsponge") and, as microparticles, may be additionally coated with film-forming polymers. The microscopically small capsules, also known as nanocapsules, can be dried in the same way as powders. Besides single-core microcapsules, there are also multiple-core aggregates, also known as microspheres, which contain two or more cores distributed in the continuous membrane material. In addition, single-core or multiple-core microcapsules may be surrounded by additional membranes. The membrane may be comprised of natural, semisynthetic or synthetic materials. Natural membrane materials are, for example, gum arabic, agar agar, agarose, maltodextrins, alginic acid and salts thereof, for example, sodium or calcium alginate, fats and fatty acids, cetyl alcohol, collagen, chitosan, lecithins, gelatin, albumin, shellac, polysaccharides, such as starch or dextran, polypeptides, protein hydrolyzates, sucrose and waxes. Semisynthetic membrane materials are, inter alia, chemically modified celluloses, more particularly cellulose esters and ethers, for example, cellulose acetate, ethyl cellulose, hydroxypropyl cellulose, hydroxypropyl methyl cellulose and carboxymethyl cellulose, and starch derivatives, more particularly starch ethers and esters. Synthetic membrane materials are, for example, polymers, such as polyacrylates, polyamides, polyvinyl alcohol or polyvinyl pyrrolidone. Examples of known microcapsules are the following commercial products (the membrane material is shown in brackets) Halkrest Microcapsules (gelatin, gum arabic), Coletica Thalaspheres (maritime collagen), Lipotec Millicapseln (alginic acid, agar agar), Induchem Unispheres (lactose, microcrystalline cellulose, hydroxypropylmethyl cellulose), Unicerin C30 (lactose, microcrystalline cellulose, hydroxypropylmethyl cellulose), Kobo Glycospheres (modified starch, fatty acid esters, phospholipids), Softspheres (modified agar agar), Kuhs Probiol Nanospheres (phospholipids) and Primaspheres or Primasponges (chitosan, anionic polymers). The encapsulation of the compositions according to the present invention is preferred where the active is intended to be liberated at the same part of the intestine. Therefore, one skilled in the art can easily select the adequate encapsulation system by comparing the stability of the capsules under the pH-conditions of the respective part of the intestine.

Food Compositions

A further embodiment of the present invention relates to food compositions, comprising
(a) prebiotics; and
(b) physiologically active fatty acids, their salts or their esters, and mixtures thereof.

The compositions may further comprise certain plant extracts, like extracts of *Camellia sinensis* (Green tea) or *Olea europensis* (Olive tree), which are rich in actives like polyphenols, oleuropein, and hydroxytyrosol.

INDUSTRIAL APPLICATION

Another embodiment of the present invention is related to the use of mixtures, comprising
(a) prebiotics; and
(b) physiologically active fatty acids, their salts or their esters, and mixtures thereof,
for stimulating the growth of healthy bacteria, for example in the stomach (if administered orally) or on skin (if applied topically) and for improving the status of the human body, for example with respect to
reduction of *Heliobacter pylori* infection,
reduction of allergic symptoms,
relief from constipation,
relief from inflammatory bowel syndrome and inflammations of the intestine, beneficial effects from mineral metabolism, particularly bone density and stability (osteoporosis prevention), cancer prevention, and reduction of cholesterol and triacylglycerol plasma concentrations.

The following examples are illustrative of the invention and should not be considered as limiting the scope of the invention in any manner whatsover.

EXAMPLES

Examples 1 to 10, Comparative Examples C1 to C18

The stimulation of growth of microorganisms has been studied by enumerating *bifidobacterium* and lactobacilli in vitro in the presence of various test substances. More specifically, aliquots (1 mL) of human faecal homogenates (10 g per 100 mL diluent) were added to diluted WC broth (diluted 50:50 with 0.05M phosphate buffer) to which were added the test mixtures and a *lactobacillus* or *bifidobacterium* strain. For each of the combinations, parallel tubes were prepared with one set being inoculated with *Bifidobacterium* spp or *Lactobacillus* spp. All mixtures were then incubated for up to 24 hours and bacterial numbers enumerated. The results are presented in Tables 1 and 2:

Starting from a control of $2.8 \times 10^5$ CFU/ml (O), the addition of 1% b.w. of various prebiotics (Comparative Examples C9-C12) increased the CFU by a factor of 4, while the addition of the fatty acids had only a weak effect on the stimulation of cell growth (Comparative Examples C13-C16). Adding however, a mixture of prebiotics and fatty acids to the samples, the CFU numbers were multiplied by a factor of about 15 (Inventive Examples 6 to 10). The highest synergistic effect can be seen again at a ratio of prebiotic:fatty acid of about 90:10.

Example 11

Yogurt Composition

Soy milk is added to 15-75 parts by volume of cow milk to make 100 parts of the mixture. The mixture is then pasteurised at about 90° C. for 15 seconds and then cooled. The cooled, pasteurised mixtures are then inoculated with 3 to 5 percent by volume of a yogurt culture having 1:1 ratio of *Lactobacillus bulgaricus* and *Bifidobacterium adolescentis*. The incubation is carried out at about 42° C. In about 2 hours, thickening will occur. The fermentation is carried out for about 5.5 hours. The yogurt compositions thus obtained is treated with 1%—calculated on the amount of microorganisms being present—of a 9:1 mixture of inulin and CLA. The products have a firm consistency and a flavor like or substantially indistinguishable from that of a corresponding yogurt composition using 100 percent of fresh cow milk. A small amount of citric acid can be added to the fermentation mixture to enhance the flavor of the final yogurt composition. A suitable amount of citric acid is 0.5 percent based on the weight of the composition.

TABLE 1

Effect of 1% prebiotic, fatty acid and prebiotic/fatty acid mixture on *Bifidobacterium*

| | 0 | C1 | C2 | C3 | C4 | C5 | C6 | C7 | C8 | 1 | 2 | 3 | 4 | 5 |
|---|---|---|---|---|---|---|---|---|---|---|---|---|---|---|
| Inulin | — | 1.0 | — | — | — | — | — | — | — | 0.8 | 0.9 | — | — | — |
| Lactosucrose | — | — | 1.0 | — | — | — | — | — | — | — | — | 0.9 | — | — |
| Lactolin | — | — | — | 1.0 | — | — | — | — | — | — | — | — | 0.9 | — |
| Betaglucan | — | — | — | — | 1.0 | — | — | — | — | — | — | — | — | 0.9 |
| CLA | — | — | — | — | — | 1.0 | — | — | — | 0.2 | — | — | — | — |
| CLA-TG | — | — | — | — | — | — | 1.0 | — | — | — | 0.1 | 0.1 | — | — |
| CLA-SE | — | — | — | — | — | — | — | 1.0 | — | — | — | — | 0.1 | — |
| EPA/DHA | — | — | — | — | — | — | — | — | 1.0 | — | — | — | — | 0.1 |
| Bacterial numbers (CFU/ml) | $1.0 \times 10^6$ | $1.5 \times 10^7$ | $1.1 \times 10^7$ | $1.6 \times 10^7$ | $1.2 \times 10^7$ | $3.5 \times 10^6$ | $2.1 \times 10^6$ | $2.9 \times 10^6$ | $3.3 \times 10^6$ | $4.0 \times 10^7$ | $4.2 \times 10^7$ | $4.3 \times 10^7$ | $4.1 \times 10^7$ | $4.5 \times 10^7$ |

Starting from a control of $1.0 \times 10^6$ CFU/ml (O), the addition of 1% b.w. of various prebiotics (Comparative Examples C1-C4) increased the CFU by a factor of 10, while the addition of the fatty acids had only a weak effect on the stimulation of cell growth (Comparative Examples C5-C8). Adding, however, a mixture of prebiotics and fatty acids to the samples, the CFU numbers were multiplied by a factor of about 40 (Inventive Examples 1 to 5). The highest synergistic effect can be seen at a ratio of prebiotic:fatty acid of about 90:10.

TABLE 2

Effect of 1% prebiotic, fatty acid and prebiotic/fatty acid mixture on *Lactobacterium*

| | 0 | C9 | C10 | C11 | C12 | C13 | C14 | C15 | C16 | 6 | 7 | 8 | 9 | 10 |
|---|---|---|---|---|---|---|---|---|---|---|---|---|---|---|
| Inulin | — | 1.0 | — | — | — | — | — | — | — | 0.8 | 0.9 | — | — | — |
| Lactosucrose | — | — | 1.0 | — | — | — | — | — | — | — | — | 0.9 | — | — |
| Lactolin | — | — | — | 1.0 | — | — | — | — | — | — | — | — | 0.9 | — |
| Betaglucan | — | — | — | — | 1.0 | — | — | — | — | — | — | — | — | 0.9 |
| CLA | — | — | — | — | — | 1.0 | — | — | — | 0.2 | — | — | — | — |
| CLA-TG | — | — | — | — | — | — | 1.0 | — | — | — | 0.1 | 0.1 | — | — |
| CLA-SE | — | — | — | — | — | — | — | 1.0 | — | — | — | — | 0.1 | — |
| EPA/DHA | — | — | — | — | — | — | — | — | 1.0 | — | — | — | — | 0.1 |
| Bacterial numbers (CFU/ml) | $2.8 \times 10^5$ | $1.4 \times 10^6$ | $1.1 \times 10^6$ | $1.5 \times 10^6$ | $1.1 \times 10^6$ | $4.2 \times 10^5$ | $4.4 \times 10^5$ | $4.4 \times 10^5$ | $4.6 \times 10^5$ | $6.3 \times 10^6$ | $6.5 \times 10^6$ | $6.6 \times 10^6$ | $6.3 \times 10^6$ | $6.8 \times 10^6$ |

What we claim is:

1. A composition for topical and/or oral administration comprising:
   (a) one or more prebiotics selected from the group consisting of fructooligosaccharides, inulins, isomaltooligosaccharides, lactilols, lactosucroses, lactuloses, pyrodextrins, soy oligosaccharides, transgalactooligosaccharides, xylooligosaccharides, and mixtures thereof; and
   (b) one or more physiologically active fatty acid compounds selected from the group consisting of fatty acids, fatty acid salts, fatty acid esters, and mixtures thereof, wherein the fatty acid comprises 18 to 26 carbon atoms and 2 to 6 double bonds;
   wherein components (a) and (b) are present in a weight ratio from 92:8 to 80:20, and wherein the combination of (a) and (b) synergistically enhances the growth of Bifidobacteria and/or Lactobacilli.

2. The composition of claim 1, wherein component (b) comprises a fatty acid ester of glycerol or a sterol.

3. The composition of claim 1, wherein component (b) comprises a conjugated linoleic acid or an omega-3 fatty acid.

4. The composition of claim 3, wherein component (b) comprises a conjugated linoleic acid.

5. The composition of claim 3, wherein component (b) comprises an omega-3 fatty acid.

6. The composition of claim 1, further comprising one or more microorganisms, wherein components (a) and (b) are present in an amount of up to 10% by weight based on the amount of microorganisms in the composition.

7. The composition of claim 1, wherein said components (a) and (b) are macro- or micro-encapsulated.

8. The composition of claim 1, wherein oral administration of said composition stimulates the growth of Bifidobacteria and/or Lactobacilli.

9. The composition of claim 1, wherein topical administration of said composition stimulates the growth of Bifidobacteria and/or Lactobacilli.

* * * * *